UNITED STATES PATENT OFFICE.

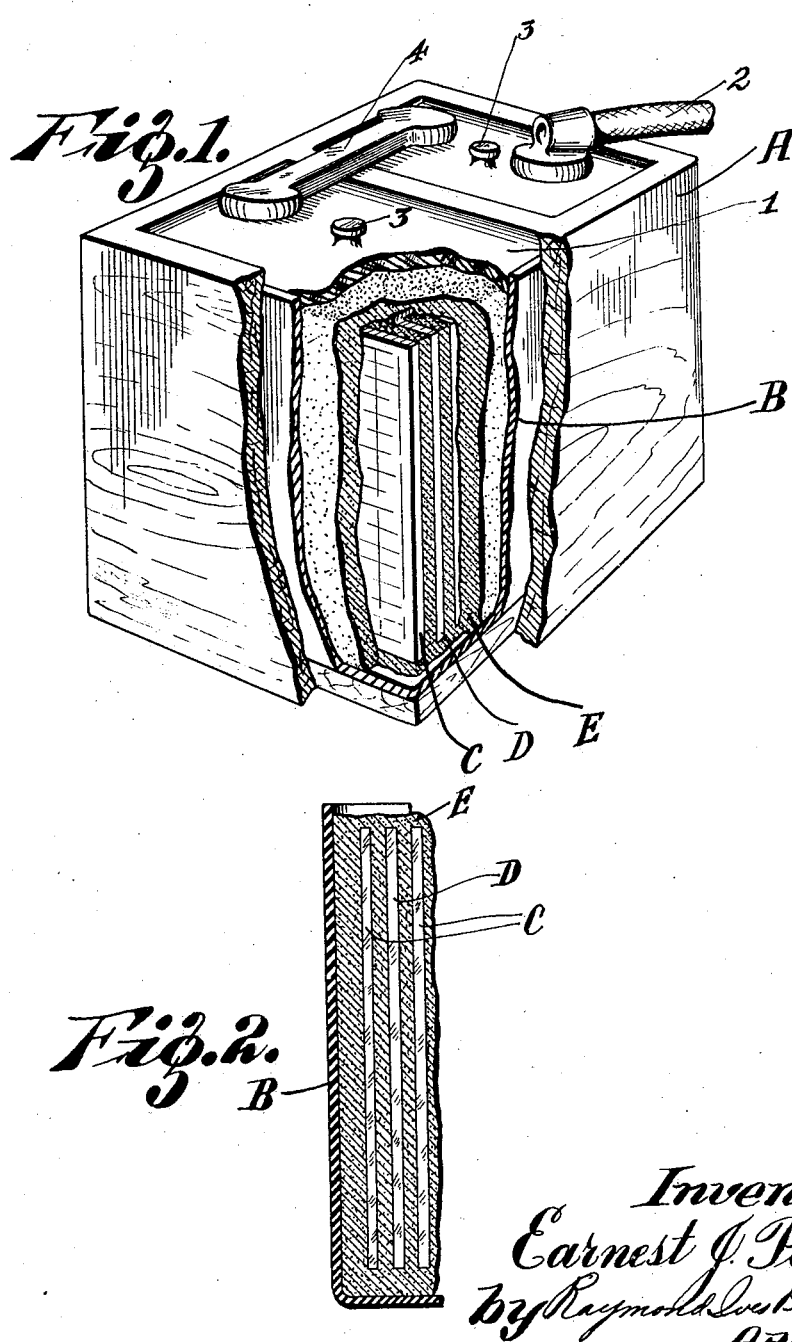

EARNEST J. PETRIE, OF LOS ANGELES, CALIFORNIA.

BATTERY.

1,405,627.  Specification of Letters Patent.  Patented Feb. 7, 1922.

Application filed November 22, 1920. Serial No. 425,649.

*To all whom it may concern:*

Be it known that I, EARNEST J. PETRIE, a citizen of the United States, residing at Los Angeles, in the county of Los Angeles and State of California, have invented new and useful Improvements in Batteries, of which the following is a specification.

This invention relates to batteries, and particularly to a substance which may be incorporated in said batteries, which substance possesses properties that may make said batteries more durable, useful and efficient. The invention has for an object the provision of a substance which will tend to keep the electrolyte in a normal active condition. Another object is the provision of a substance in combination with a battery which will tend, in the case of fluid cells to maintain the electrolyte in suspension.

The substance about to be described is particularly useful in storage batteries in that it aids in overcoming various defects and faults now existing in this type of battery. The ordinary storage battery includes an outer casing usually made of wood, and an inner container usually formed of hard rubber. Within the container are placed positive and negative plates formed of lead. The positive plate is coated with an active material of peroxide of lead, and the negative plate with spongy metallic lead. To prevent contact of the adjacent faces of the positive and negative plates I pour between the same the substance about to be described, which substance fills all interstices between the plates and within the hard rubber container. The storage battery may be of any commercial make or form and the only difference in the same consists in placing therein the substance, which is the basis of this invention.

The substance in particular consists of the well-known kieselguhr, or what might be commercially termed tripoli, sil-o-cel, sometimes called infusorial, but better known in geology as diatomaceous earth. Diatomaceous earth is formed from diatoms by the precipitation of the remains. Deposits of diatoms appear almost universally in all waters, whether still or running. The diatoms in particular have a silica shell or casing cemented by the assimilation of inorganic substances in solution in the water about them, through the agency of sunlight in conjunction with the chlorophyll masses which compose the bodies of the plants. Diatomaceous shells are found in a variety of localities and occur in enormous beds. Analysis of the material reveals a composition on the moisture-free-basis of silica, alumina, iron oxide, titanium oxide, lime and magnesia. Usually there is only a trace of titanium oxide and lime, the principal constituent of the diatoms being silica. In its natural state kieselguhr or diatomaceous earth contains from 25 to 45 per cent moisture, which is expelled at 100 degrees C., and is pure white to brownish, very light weight, soft, easily abraded material. The condition of the silica, its principal constituent, is one of the characteristic properties, it being in the amorphous or opaline state, carrying ordinarily from 5 to 10 per cent of combined water. The specific gravity of diatomaceous earth is approximately 2.1 to 2.2 at 25 C., indicating that it is amorphous silica, which is usually taken as 1.9 to 2.3. Deposits of diatomaceous earth usually contain 25 to 45 per cent by weight absorbed water. In physical appearance diatomaceous earth is, as to form, in a fine state of division, having enclosed air cells, large exposed surface of cells, sharpness of cells, and weak or of low compressive strength of cells. It is also refractory in nature and a large amount of colloidal material is present. Its chemical characteristics are siliceous or of inorganic nature; easily soluble in alkalies; insoluble in acid or neutral solutions.

One of the chief advantages of diatomaceous earth lies in its light weight, a cubic foot of the same weighing about 8 pounds. Furthermore, it is not affected by extreme heat or cold, and is not subject to decomposition, decay or any physical change with time. Diatomaceous earth likewise has a high porosity, and therefore may be used as an absorbing medium wherever it is desirable to give the properties of a solid to a liquid or some solid material. Pulverized diatomaceous earth absorbs from 150 to 200 per cent of its weight of water without in any manner changing its form. It therefore may be used as an absorbent or vehicle for liquids such as sulphuric acid which are evolved slowly, thus rendering them active for a long period of time. As stated, diatomaceous earth is not affected by the action of acids, with the possible exception of hydrofluoric, which feature makes it suitable for the absorption or transportation of these bodies without contaminating them.

As stated in the beginning, storage cells usually comprise plate members within a container provided with separators between the positive and negative plates to prevent a shorting. The separators are necessary, as stated, to keep plates of opposite polarity apart, and yet the space between the plates should be as small as possible in order to keep the internal resistance of the cells at a low point. It is apparent that current used to overcome internal resistance cannot be used in an external circuit. As a rule, separators are made of rubber, glass or wood. Wood is usually used on small cells. The material is specially selected and chemically treated. They are made very thin, and after cutting from seasoned wood they receive treatment to remove any element that might cause damage if left in the wood. Thereafter, the separator strips are kept soaked in a weak electrolyte solution until they are installed in batteries. They must never be allowed to dry out, and even in transit from factory to service station they should be packed in such a way as to retain their moisture. Once a separator is dried out it can never be used again, as the separator loses its vitality and is prone to split and undermine the battery's health. A badly shattered separator invites a direct short circuit, and affords the opportunity for "treeing" across from negative to positive. It also furthers the possibility of sulphation.

In utilizing the diatomaceous earth or any substance having similar chemical constituents, I take the powdered material and place same intermediate the positive and negative plates as well as filling the entire container with the same. When this has been done the cell cover may be sealed upon the container and the electrolyte which consist of sulphuric acid and distilled water may be poured through the vents projecting through the cover, or sulphuric acid may be poured in upon the diatomaceous earth which surrounds the internal mechanism of the battery before sealing on the cover. The electrolyte is immediately absorbed by the diatomaceous earth or amorphous silica or its compounds, for the reason that said material may absorb from 150 to 200 times its own weight of a liquid. Inasmuch as diatomaceous earth already contains a certain amount of water it may be necessary under certain conditions to expel the water by heating the diatomaceous earth to 100 degrees C. It will thus be seen that the amount of electrolyte contained in the battery is practically the same as if no diatomaceous earth were within the same.

Treating a battery in the manner just indicated, will overcome certain troubles now incident to storage batteries which may be summarized as follows: Low electrolyte reduces the capacity of a cell, because less plate surface is exposed to the electrolyte; and also because the spongy lead associated with the negative plate will harden when exposed to air. Diatomaceous earth or a compound or substance of similar nature tends to absorb the electrolyte and maintain the same in suspension. It follows that excessive evaporation is therefore overcome and there is little likelihood of the spongy lead becoming exposed to air. Furthermore, if the electrolyte is maintained in suspension all of the plate surface will be exposed to action of the electrolyte, thus remedying one trouble. A second trouble may be low specific gravity, and specific gravity may be reduced below the normal either by excessive sulphation, by internal discharge, or by acid losses due to too much spraying. The diatomaceous earth being porous in its nature and made up of many cells tends to prevent acid spray resulting from gassing. Furthermore, excessive sulphation is prevented inasmuch as the electrolyte is at all times maintained in suspension within the diatomaceous earth. It is of course realized that sulphation is generally caused by an improper charging or discharging of the battery. Another trouble is what is called shedding; that is, after the plates have been in service for some time they will frequently lose capacity on account of active material dropping off, or shedding. This action is most common on positive plates which contain peroxide of lead. This shedding also causes a sediment to be formed in the bottom of the battery tank. Obviously the packing of the diatomaceous earth or similar material between the plates tends to prevent this shedding by holding the active materials in place; thus, shedding cannot occur and cause the sediment or mud to be formed in the bottom of the battery tank. Some battery makers use close fitting separators to prevent shedding, but they cannot always be used, for the reason that they tend to reduce capacity. It is obvious that the material used by the inventor does not tend to reduce the capacity of the cell. Another fault or trouble with the average storage battery is due to the warping or buckling of the separators, which causes a cell to short circuit itself and become completely ruined. Obviously a buckling of plates is impossible when the diatomaceous earth or similar substance is pressed between the plates, and in addition completely contained within the battery container. An attempt to buckle on the part of any of the plates would communicate a pressure through the diatomaceous earth to the next adjoining plate and so on. The cell container, however, being formed of hard rubber or similar substance and being quite stiff, would tend to resist this pressure, and as a result there would be an equal and opposite pressure against the pressure exerted by a plate attempting to buckle. Thus it will be seen that buckling or warping of a plate or plates is overcome. Another trouble is due to cracking or splitting of the separators. The material used by the inventor of course cannot crack or split, and therefore this fault is remedied. Oftentimes batteries are troubled with internal discharge which results in a loss of capacity. This discharge may be due to foreign material bridging the plates, contact of the plates with each other or too much sediment in the bottom of the jar. In order to remedy these faults in the ordinary form of storage battery, it is necessary to remove the plates and clean the same. However, with the use of my material these faults are all overcome because the foreign material cannot bridge the plates nor can the plates contact with each other, nor can sediment form in the bottom of the jar.

A fault common in storage battery practice is due to the hardening of the negative material. The negative plate active material when in good condition is porous and soft. However, when it is exposed to air it becomes hard and absorbs oxygen, thus tending to cause the pores of the plates to become clogged and the capacity reduced. The presence of diatomaceous earth, carrying as it does the electrolyte in suspension, will prevent a hardening of the negative plate active material, because it will never be exposed to the air.

Another fault is due to muddy or soft positives caused by too much overcharge. When the plates are soft, as stated, the active material tends to shed, but this shedding is prevented, as has been fully set forth hereinabove.

Loss of voltage is usually caused by sulphation or by low density of electrolyte and by short circuit. Low density of electrolyte is overcome because the electrolyte is maintained in suspension in the diatomaceous earth. Furthermore, short circuit is overcome as well as sulphation, as has been pointed out.

Frozen cells and erosion of the plates in the cells are difficult troubles to overcome in storage batteries, the erosion of the plates being caused as a rule by the presence of forming acids. However, the diatomaceous earth allows for an escape of gases through the same because of the porosity of the material. It may seem upon first sight that the use of diatomaceous earth, which earth can be used as a thermal insulator, might be injurious to a cell, in that it might raise the heat within the same and not allow the heat to escape. This might be true providing the diatomaceous earth were dry instead of wet, wet diatomaceous earth not acting the same as the dry. By keeping the electrolyte in suspension as the kieselguhr or diatomaceous earth so effectively accomplishes, there is little likelihood of the electrolyte freezing and cracking the jar, as the cell thaws out.

It will thus be seen that the ordinary defects usually found in storage cells is completely overcome by the use of the material such as used by the inventor.

The use of diatomaceous earth within a storage cell renders it possible to use zinc plates in place of lead ones. A zinc plate gives an increase of voltage over a lead plate. Furthermore, zinc plates can be lighter than lead plates of the same capacity. The disadvantage heretofore in zinc plates has been the formation of zinc deposits during the charging of the battery, in the shape of clusters or trees which may short circuit the cell by extending across to the positive element or increase the sediment by dropping to the bottom. Another disadvantage has been that the electrolyte will vary in density at different heights. Attempts have been made to prevent this by placing the plates horizontally, and thus having practically the same density electrolyte surrounding each plate. The fault of this arrangement is that gas bubbles polarize the cell by collecting between the plates. In a vertical plate cell the bubbles rise to the top of the electrolyte and burst liberating the gas, which reaches the atmosphere easily in an open top cell and through a vent in the sealed types. One well-known storage battery manufacturer uses negative plates consisting of thin sheet copper amalgamated with zinc and other means for overcoming the faults of zinc plates just mentioned. By placing diatomaceous earth or a similar substance or compound between the zinc plates treeing is overcome, as well as all the faults just mentioned.

Obviously diatomaceous earth might be incorporated in other cells besides storage cells, as for instance, dry cells. A dry cell usually consists of a zinc casing having therein a carbon or copper element and a depolarizing material interposed between the said elements. Usually a thin sheet of blotting paper is placed on the inner surface of the zinc between the zinc and the depolarizer. As the dry cell is used water forms therein and the blotting paper becomes saturated and finally the zinc is eaten through resulting in a loss of capacity of the battery. In place of using blotting paper dry kieselguhr or diatomaceous earth or a similar compound might be placed within the cell. The kieselguhr would tend to retain any water formed therein in suspension within the same and thus help prevent moisture from escaping through weakened parts or eaten parts of the zinc to the outer casing of the battery. This might tend to longevity of the cell.

The invention has for further objects the provision of an improved compound or substance which may be incorporated in batteries of any known type, and which will be superior in point of simplicity and inexpensiveness, taken in conjunction with utility, durability, and general efficiency and serviceability.

With above mentioned and other objects in view, the invention consists in the novel and useful provision, formation, construction, combination, association and interrelation of parts, members and features, as illustrated in some of its embodiments in the accompanying drawing, described in the following detailed description and finally pointed out in claim.

In the drawing:

Figure 1 is a fragmentary perspective view, certain parts being in section, of a storage battery incorporating the improved material; and Figure 2 is a fragmentary cross sectional elevation of the improved material shown in cooperation with the plate elements of a storage cell.

Corresponding parts in both figures are designated by the same reference characters.

In the drawing which illustrates one manner of utilizing the invention, A represents the wooden case of a storage battery, B the inner container thereof, C and D the positive and negative plates within the container, and E the improved medium, compound or substance similar to or consisting of diatomaceous earth. The plates C and D are in spaced relation to each other, as shown, and the material E is pressed in and between the space between said plates, as well as on the outside edges of said plates, and all space within the container B. After the electrolyte has been poured in upon said material E a cover 1 may be sealed to said container B, as is ordinary practice. Terminals 2 connect with the lugs associated with said plates and vents 3 communicate from the exterior to the interior of the cells. A cell connector 4 may join plates where the battery is of the two-cell type, as illustrated.

To test the cell the well-known cadimum readings may be made, as well as a hydrometer reading taken. To take a hydrometer reading a hydrometer syringe is introduced in a vent hole and a portion of the electrolyte withdrawn from the cell. In order to accomplish a withdrawing of a portion of the electrolyte it may be necessary to leave a small space beneath one of the vents so that electrolyte solution may form in said space.

It is obvious that many changes and variations and modifications may be made in departure from the particular description and showing of the accompanying drawing in adapting the invention to varying conditions and requirements of use and service, without departing from the true spirit of the invention.

Having thus disclosed my invention, I claim and desire to secure by Letters Patent:

An electrical current producing apparatus, including positive and negative elements and means entirely surrounding and covering said elements, said means being an amorphous silica that has first been dried of all moisture.

In testimony whereof, I have signed my name to this specification in the presence of two subscribing witnesses.

EARNEST J. PETRIE.

Witnesses:
J. SHUTT,
MILDRED LEACH.